(12) United States Patent
Ogura et al.

(10) Patent No.: US 9,113,126 B2
(45) Date of Patent: Aug. 18, 2015

(54) PROJECTOR ACTIVATION METHOD INTEGRATED WITHIN A CAMERA

(75) Inventors: Tomotaka Ogura, Tokyo (JP); Katsumi Ikuta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 13/235,422

(22) Filed: Sep. 18, 2011

(65) Prior Publication Data

US 2012/0075516 A1 Mar. 29, 2012

(30) Foreign Application Priority Data

Sep. 27, 2010 (JP) ................................ 2010-214656

(51) Int. Cl.
  *H04N 9/31* (2006.01)
  *H04N 9/81* (2006.01)
  *H04N 5/232* (2006.01)
  *H04N 5/77* (2006.01)
  *H04N 9/82* (2006.01)

(52) U.S. Cl.
  CPC ........... *H04N 5/772* (2013.01); *H04N 5/23245* (2013.01); *H04N 9/3176* (2013.01); *H04N 5/23293* (2013.01); *H04N 9/8227* (2013.01)

(58) Field of Classification Search
  USPC ............. 348/333.1, 333.11–333.13; 352/138; 396/430; 345/93, 67, 134; 250/208.1, 250/214 R; 353/30, 28, 21, 85
  See application file for complete search history.

(56) References Cited

U.S. PATENT DOCUMENTS 3,705,326 A * 12/1972 Ashcraft et al. ................. 314/34
7,448,759 B2 * 11/2008 Fukano ........................... 353/85
7,519,290 B2 * 4/2009 Nozaki ......................... 396/430
7,625,092 B2 * 12/2009 Ahn ................................ 353/85
2004/0027486 A1 * 2/2004 Fujiwara et al. .............. 348/557
2007/0030360 A1 2/2007 Udono
2009/0027570 A1 * 1/2009 Fujinawa ...................... 348/744
2009/0040476 A1 * 2/2009 Masukawa ...................... 353/85
2009/0251622 A1 * 10/2009 Mitsuhashi et al. .......... 348/745
2009/0310091 A1 * 12/2009 Nozaki et al. ................... 353/85
2010/0002123 A1 * 1/2010 Nozaki et al. .............. 348/333.1

(Continued)

FOREIGN PATENT DOCUMENTS

JP 2006-71682 A 3/2006
JP 2006-222547 A 8/2006

(Continued)

OTHER PUBLICATIONS

Extended European Search Report issued Jan. 25, 2012, in Patent Application No. 11181926.4.

(Continued)

*Primary Examiner* — Roberto Velez
*Assistant Examiner* — Quan Pham
(74) *Attorney, Agent, or Firm* — Oblon, McClelland, Maier & Neustadt, L.L.P.

(57) ABSTRACT

An image pickup apparatus includes an image capturing unit, a projection unit, a reproduction processing unit configured to perform processing for reproducing image data, and a control unit configured to switch between operation modes at least including an image capturing mode in which the image capturing unit performs image capturing and a reproduction mode in which the reproduction processing unit performs reproduction processing. When the operation mode is switched to the reproduction mode, the control unit starts activation processing for activating the projection unit.

15 Claims, 9 Drawing Sheets

(56) References Cited

U.S. PATENT DOCUMENTS

| | | |
|---|---|---|
| 2010/0053475 A1* | 3/2010 | Han et al. ............... 348/744 |
| 2010/0053558 A1* | 3/2010 | Yanagisawa ............ 353/20 |
| 2010/0208216 A1* | 8/2010 | Hirabayashi ............ 353/85 |
| 2011/0032488 A1* | 2/2011 | Abe et al. ............... 353/54 |
| 2011/0164169 A1 | 7/2011 | Yamasaki |

FOREIGN PATENT DOCUMENTS

| | | |
|---|---|---|
| JP | 2007-311958 A | 11/2007 |
| JP | 2008-252602 | 10/2008 |
| JP | 2009-186864 A | 8/2009 |
| JP | 2010-114476 A | 5/2010 |
| WO | WO 2010/050386 A1 | 5/2010 |

OTHER PUBLICATIONS

Office Action issued on Dec. 2, 2014 in the corresponding Japanese Patent Application No. 2010-214656.

\* cited by examiner

PROJECTOR ACTIVATION METHOD INTEGRATED WITHIN A CAMERA

BACKGROUND

The present disclosure relates to an image pickup apparatus, an image pickup apparatus control method, and a program.

In recent years, image pickup apparatuses including a small projector have been proposed. Since such an image pickup apparatus can project from a projector content acquired by image capturing, many users can view the content with no display apparatus (see, for example, Japanese Unexamined Patent Application Publication No. 2008-252602).

In such an image pickup apparatus, an operation of switching between operation modes including a subject image capturing mode and a content reproduction mode is performed.

SUMMARY

When the above-described operation mode switching operation is performed, an image pickup apparatus performs control processing in accordance with a set mode. For example, when the content reproduction mode is set, an image pickup apparatus displays an index screen image including a plurality of thumbnails on a display apparatus. A user can select content to be reproduced from among the displayed thumbnails.

At that time, when a projection start operation is performed, the image pickup apparatus performs processing for activating a projector and projects a screen image after performing the activation processing. Since the projector activation processing takes time, a user has to wait until projection is started after the projection start operation has been performed and feels stress.

For example, the reason why the projector activation processing takes time is because it takes time to obtain stable brightness of a light source used in a projector. In particular, in the case of a projector including a high-pressure mercury lamp as a light source, it takes several tens of seconds to obtain stable brightness of the light source. When another type of light source such as an LED (Light Emitting Diode) is used, time taken to turn on the light source can be significantly shortened and a projector can be activated in few seconds. Even in this case, a user feels stress.

It is desirable to provide a new and improved image pickup apparatus capable of quickly starting projection of an image from a projector, an image pickup apparatus control method, and a program.

An image pickup apparatus according to an embodiment of the present disclosure includes an image capturing unit, a projection unit, a reproduction processing unit configured to perform processing for reproducing image data, and a control unit configured to switch between operation modes at least including an image capturing mode in which the image capturing unit performs image capturing and a reproduction mode in which the reproduction processing unit performs reproduction processing. When the operation mode is switched to the reproduction mode, the control unit starts activation processing for activating the projection unit.

After the activation processing has ended and a projection start instruction to cause the projection unit to start projection has been input, the control unit may cause the projection unit to start projection.

The image pickup apparatus may further include a display unit. In the reproduction mode, an image data selection screen image may be displayed on the display unit, and the reproduction processing unit may reproduce image data selected on the image data selection screen image.

While the activation processing for activating the projection unit is performed in the reproduction mode, the control unit may display a fact that the activation processing is being performed on the display unit.

When the projection start instruction is input during the activation processing for activating the projection unit in the reproduction mode, the control unit may display a fact that the activation processing is being performed on the display unit.

While the projection start instruction to cause the projection unit to start projection is not input after the activation processing for activating the projection unit has ended in the reproduction mode, the control unit may display a fact that the activation processing has ended on the display unit.

The activation processing for activating the projection unit may include initial setting of the projection unit.

The activation processing for activating the projection unit may include processing for turning on a light source of the projection unit in a state in which a lid for blocking light from the light source is closed. The lid may be opened when the projection unit starts projection.

The light source of the projection unit may be a high-pressure mercury lamp.

An image pickup apparatus control method according to another embodiment of the present disclosure includes switching between operation modes at least including an image capturing mode in which an image capturing unit performs image capturing and a reproduction mode in which a reproduction processing unit performs reproduction processing to set the reproduction mode and starting activation processing for activating a projection unit when the reproduction mode is set.

A program according to still another embodiment of the present disclosure causes a computer to function as a control unit configured to start activation processing for activating a projection unit when switching between operation modes at least including an image capturing mode in which an image capturing unit performs image capturing and a reproduction mode in which a reproduction processing unit performs reproduction processing is performed and the reproduction mode is set.

As described previously, according to the present disclosure, it is possible to quickly start projection of an image from a projector.

DETAILED DESCRIPTION OF EMBODIMENTS

Embodiments of the present disclosure will be described in detail below with reference to the accompanying drawings. In this specification and the drawings, the same reference numerals are used to identify parts having practically identical function and configuration, and repeated explanation thereof will be therefore omitted.

Furthermore, in this specification and the drawings, a plurality of parts having practically identical function and configuration are distinguished by different alphabetic characters following the same reference numerals. However, when it is not necessary to distinguish among parts having practically identical function and configuration, only the same numerals are used to identify these parts.

The "DETAILED DESCRIPTION OF EMBODIMENTS" will be made in the following order.
1. Basic Configuration of Image Pickup Apparatus according to Embodiment of the Present Disclosure
2. First Embodiment
2-1. Configuration of Image Pickup Apparatus
2-2. Operation of Image Pickup Apparatus
3. Second Embodiment
4. Conclusion
[1. Basic Configuration of Image Pickup Apparatus According to Embodiment of the Present Disclosure]

As will be described in detail in "2. First Embodiment" to "3. Second Embodiment", the present disclosure may be embodied in various forms. An image pickup apparatus (1) to be described in the embodiments includes the following components and performs the following processing.
A: A projection unit (a projector module 18) for projecting a screen image
B: A control unit (100) for switching between operation modes of the image pickup apparatus
C: The control unit (100) starts processing for activating the projection unit when changing an operation mode to a reproduction mode.

First, a common basic configuration in embodiments will be described below referring to FIGS. 1 to 6.

Figure 1:
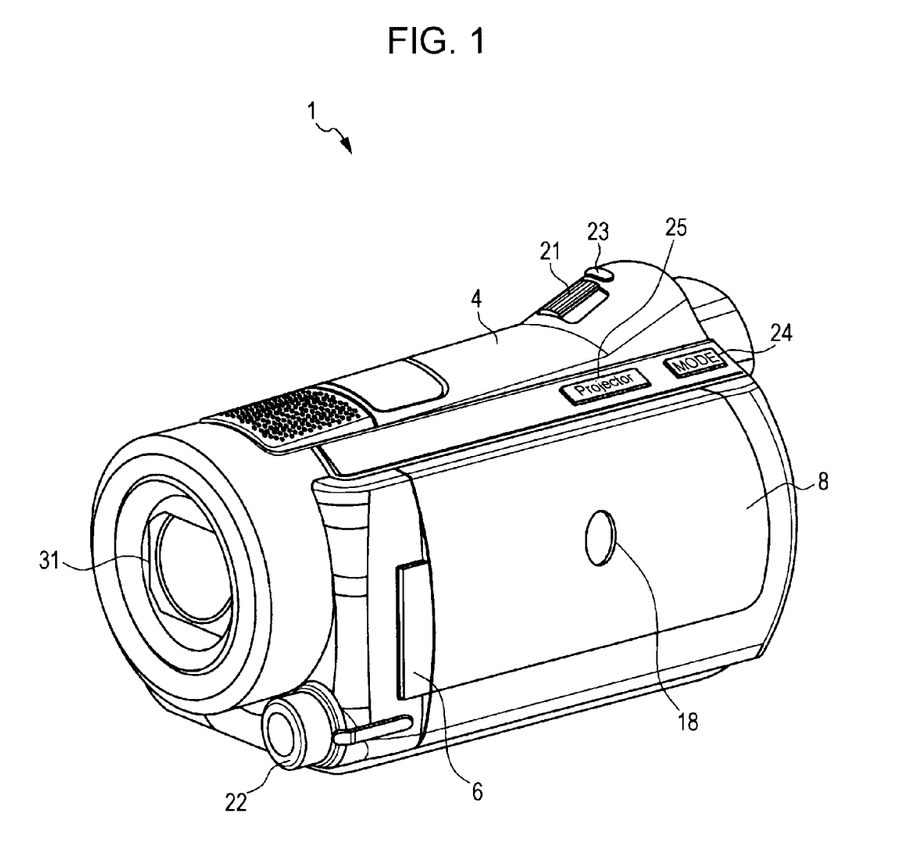
FIG. 1 is a perspective view illustrating the external appearance of an image pickup apparatus according to an embodiment of the present disclosure.
Figure 2:
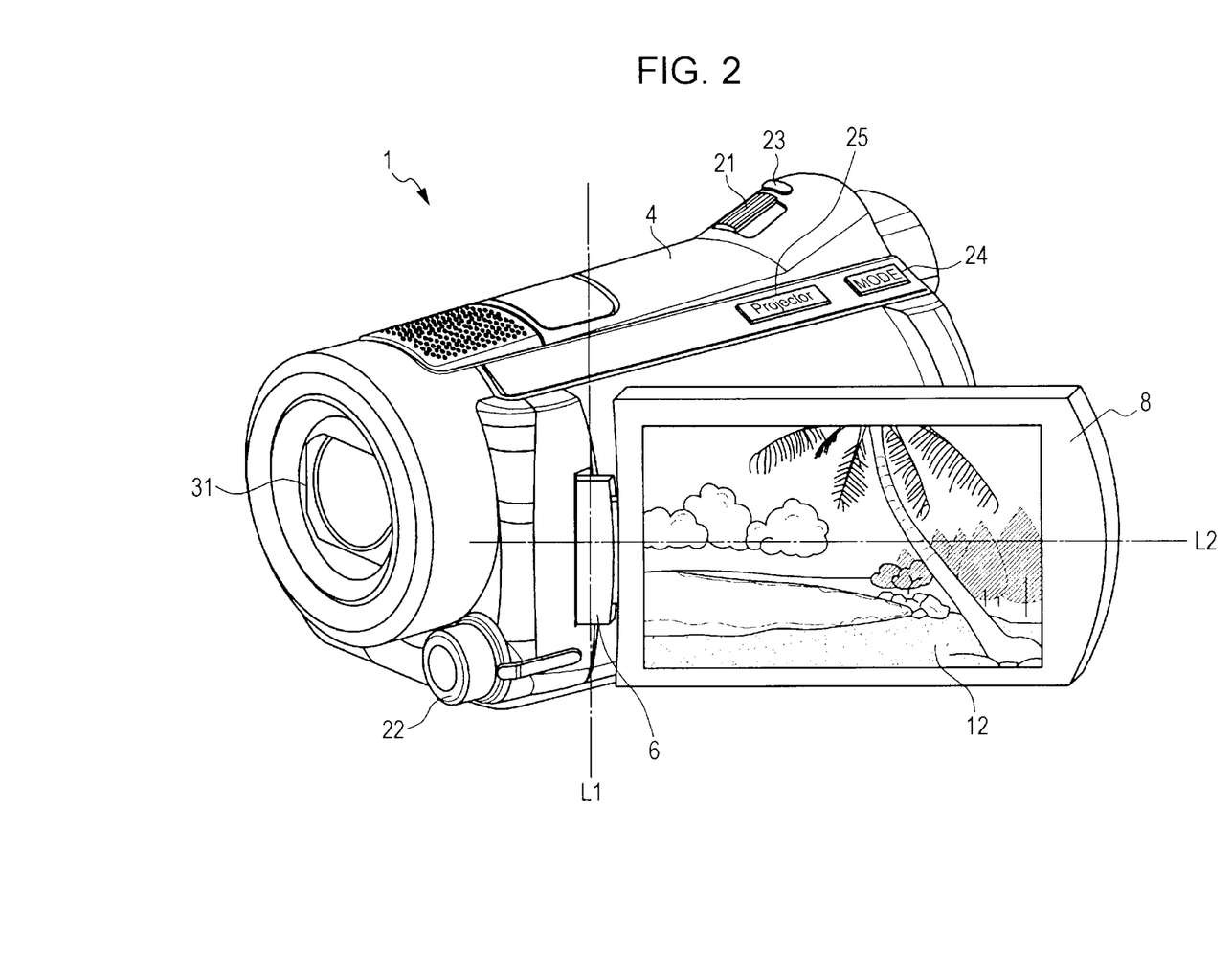
FIG. 2 is a perspective view illustrating the external appearance of an image pickup apparatus according to an embodiment of the present disclosure.

FIGS. 1 and 2 are perspective views illustrating the external appearance of an image pickup apparatus 1 according to an embodiment of the present disclosure. As illustrated in FIG. 1, the image pickup apparatus 1 includes a body 4, a hinge mechanism 6, and an opening/closing unit 8. In FIGS. 1 and 2, as an example of an image pickup apparatus, the image pickup apparatus 1 (video camera) is illustrated. However, an image pickup apparatus is not limited to the example, and may be an information processing apparatus such as a PC (Personal Computer), a PDA (Personal Digital Assistants), a home videogame machine, a mobile telephone, a PHS (Personal Handyphone System), a mobile music reproduction apparatus, a mobile image processing apparatus, or a mobile game machine.

The body 4 of the image pickup apparatus 1 includes a zoom operation unit 21, a manual operation unit 22, a still image capturing operation unit 23, a mode operation unit 24, a projection switching operation unit 25, and an image capturing optical system 31.

The image capturing optical system 31 includes an image capturing lens for collecting light emitted from a subject and a zoom lens, and forms a subject image on a signal conversion unit such as a CCD (Charge Coupled Device) or a CMOS (Complementary Metal Oxide Semiconductor). When a subject image is formed on a signal conversion unit, the subject image is converted into an electric image signal by the signal conversion unit.

The zoom operation unit 21 receives a user's operation performed to change a focal length of the image capturing optical system 31. As illustrated in FIG. 1, the zoom operation unit 21 includes a lever that can be tilted to, for example, a wide-side or a tele-side. In this case, when the lever is tilted to the wide-side, the image capturing optical system 31 reduces a focal length (reduces a subject image in size). When the lever is tilted to the tele-side, the image capturing optical system 31 increases a focal length (increases a subject image in size).

The manual operation unit 22 receives a user's operation performed to adjust the focus of the image capturing optical system 31. As illustrated in FIG. 1, the manual operation unit 22 includes a dial that can be turned, for example, clockwise or counterclockwise. In this case, the image capturing optical system 31 adjusts a focal position in accordance with a turn direction of the dial and the amount of turn of the dial.

The still image capturing operation unit 23 receives a user's operation performed for image capturing of a still image. As illustrated in FIG. 1, the still image capturing operation unit 23 includes, for example, a press button. In this case, the image pickup apparatus 1 captures a still image in response to the pressing of the button and acquires image data of the still image.

The mode operation unit 24 receives a user's operation performed for switching between operation modes of the image pickup apparatus 1. For example, main operation modes of the image pickup apparatus 1 are an image capturing mode and a reproduction mode. As illustrated in FIG. 1, the mode operation unit 24 includes, for example, a press button. In this case, the image pickup apparatus 1 switches between the image capturing mode and the reproduction mode in response to the pressing of the button.

The image capturing mode is an operation mode in which the image capturing optical system 31 and the signal conversion unit are operated and the image of a subject is captured. On the other hand, the reproduction mode is an operation mode in which image data acquired in, for example, the image capturing mode is reproduced. These operation modes will be described in detail later with reference to FIGS. 4 to 6.

The projection switching operation unit 25 receives a user's operation performed to project a screen image created by the image pickup apparatus 1 from the projector module 18. As illustrated in FIG. 1, the projection switching operation unit 25 includes, for example, a press button. In this case, the image pickup apparatus 1 projects a screen image from the projector module 18 in response to the pressing of the button. While a screen image is projected from the projector module 18, a touch panel 12 may display the projected screen image or a screen image different from the projected screen image or may display no screen image.

The configuration of the body 4 of the image pickup apparatus 1 has been described. Next, the configuration of the opening/closing unit 8 coupled to the body 4 via the hinge mechanism 6 will be described.

The opening/closing unit 8 is coupled to the body 4 via the hinge mechanism 6 so that the opening/closing unit 8 can be rotated around a first rotation axis L1 and a second rotation axis L2 perpendicular to the first rotation axis L1 illustrated in FIG. 2. FIG. 1 illustrates a state in which the opening/closing unit 8 is closed with respect to the body 4. FIG. 2 illustrates a state in which the opening/closing unit 8 is rotated around the first rotation axis L1 and is opened with respect to the body 4.

The opening/closing unit 8 includes the projector module 18 on one surface thereof as illustrated in FIG. 1 and the touch panel 12 on the other surface thereof as illustrated in FIG. 2.

The touch panel 12 is an example of an operation display unit having a display function and an operation detection function. The touch panel 12 can display an image of a subject from which light is emitted to the image capturing optical system 31 in the image capturing mode and can display an index screen image or a reproduction screen image to be described later in the reproduction mode. A user can input various instructions and information into the image pickup apparatus 1 by operating the touch panel 12.

The projector module 18 is a projection unit for projecting a screen image created by the image pickup apparatus 1. The projector module 18 can project, for example, the index screen image or the reproduction screen image to be described later in response to a user's operation performed on the projection switching operation unit 25. The detailed configuration of the projector module 18 will be described in detail below with reference to FIG. 3.

Figure 3:
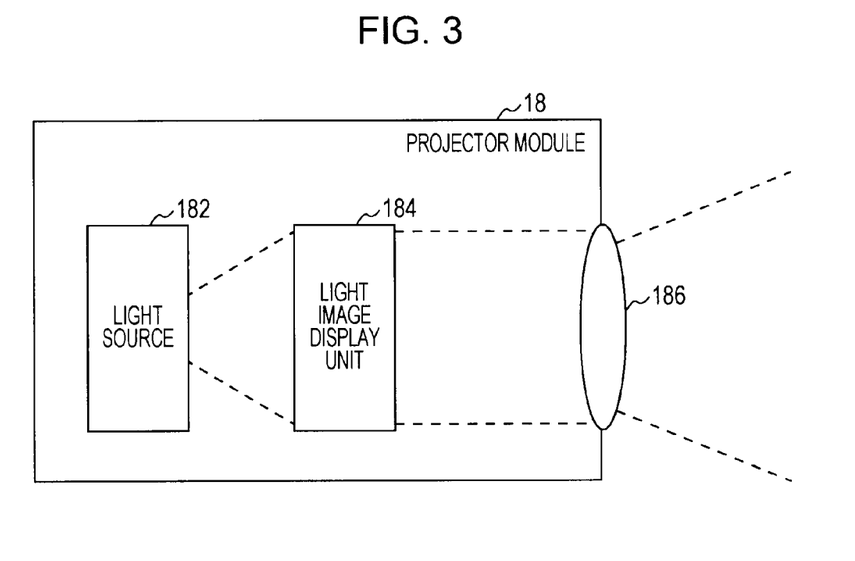
FIG. 3 is a diagram describing the configuration of a projector module.

FIG. 3 is a diagram describing the configuration of the projector module 18. As illustrated in FIG. 3, the projection module 18 includes a light source 182, a light image display unit 184, and a projection lens 186.

The light source 182 includes a white LED (Light Emitting Diode) for emitting white light and an optical system for diffusing light from the white LED and emitting the diffused light to the light image display unit 184. In this embodiment, an exemplary configuration in which the light source 182 includes a white LED will be described, but the configuration of the light source 182 is not limited thereto. For example, the light source 182 may include a high-pressure mercury lamp.

The light image display unit 184 is a liquid crystal panel for displaying a screen image to be projected. A screen image displayed on the light image display unit 184 is supplied to the projection lens 186 with light emitted from the light source 182. The projection lens 186 forms a screen image displayed on the light image display unit 184 onto a projection surface.

(Image Capturing Mode and Reproduction Mode)

The basic configuration of the image pickup apparatus 1 according to an embodiment of the present disclosure has been described. Next, the image capturing mode and the reproduction mode, which are operation modes of the image pickup apparatus 1, will be described.

Figure 4:
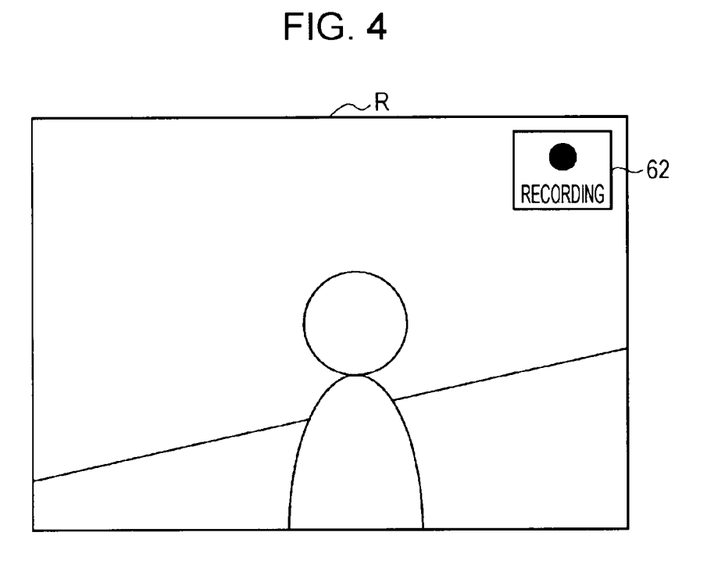
FIG. 4 is a diagram describing a concrete example of an image capturing screen image.

The image capturing mode is an operation mode in which the image capturing optical system 31 and the signal conversion unit are operated and the image of a subject is captured. In this image capturing mode, as illustrated in FIG. 4, an image capturing screen image R that is an image of a subject captured by the image capturing optical system 31 is displayed on the touch panel 12. As illustrated in FIG. 4, during recording of the image capturing screen image R, a recording mark 62 is added on the image capturing screen image R.

When a user presses the still image capturing operation unit 23 in the image capturing mode, the image pickup apparatus 1 captures a still image of a subject and acquires image data of the captured still image.

When a user presses the mode operation unit 24 in the image capturing mode, the image pickup apparatus 1 changes an operation mode to the reproduction mode. The reproduction mode is an operation mode in which content data is reproduced. Accordingly, after the reproduction mode has been set, the image pickup apparatus 1 creates an index screen image I to allow a user to select content data to be reproduced from among pieces of content data.

Figure 5:
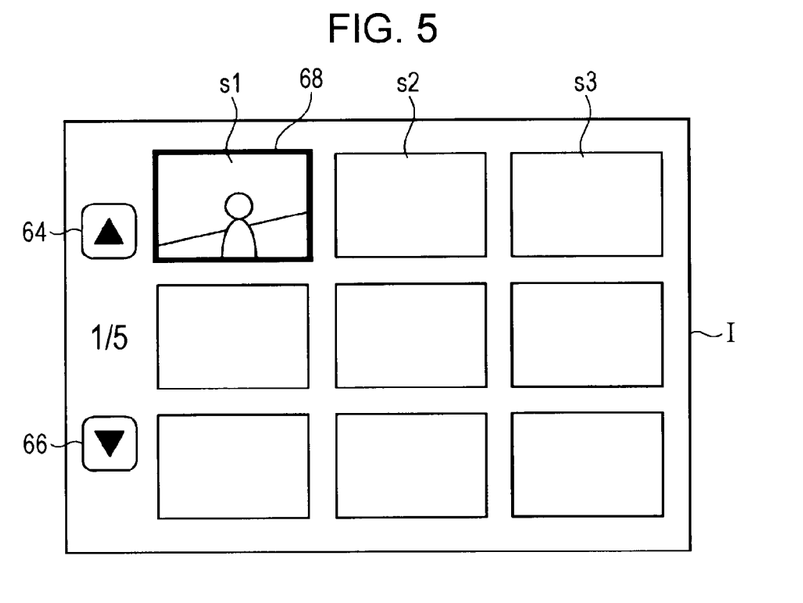
FIG. 5 is a diagram describing a concrete example of an index screen image.

FIG. 5 is a diagram illustrating a concrete example of the index screen image I. As illustrated in FIG. 5, the index screen image I includes thumbnails s1, s2, s3, and other thumbnails corresponding to a plurality of pieces of content data. The content data may be image data acquired in image capturing performed by the image pickup apparatus 1 or externally acquired image data. The type of content data is not limited to image data, and may be audio data, game, or software. Each of the thumbnails s may be a still image or a moving image.

The index screen image I further includes an up scroll button 64 and a down scroll button 66. A user can scroll the index screen image I in any direction by selecting one of the up scroll button 64 and the down scroll button 66.

A user can select content data to be reproduced by putting a cursor 68 on a desired thumbnail on the index screen image I. When a user selects content data, the image pickup apparatus 1 starts to reproduce the selected content data and creates a reproduction screen image for the content data.

Figure 6:
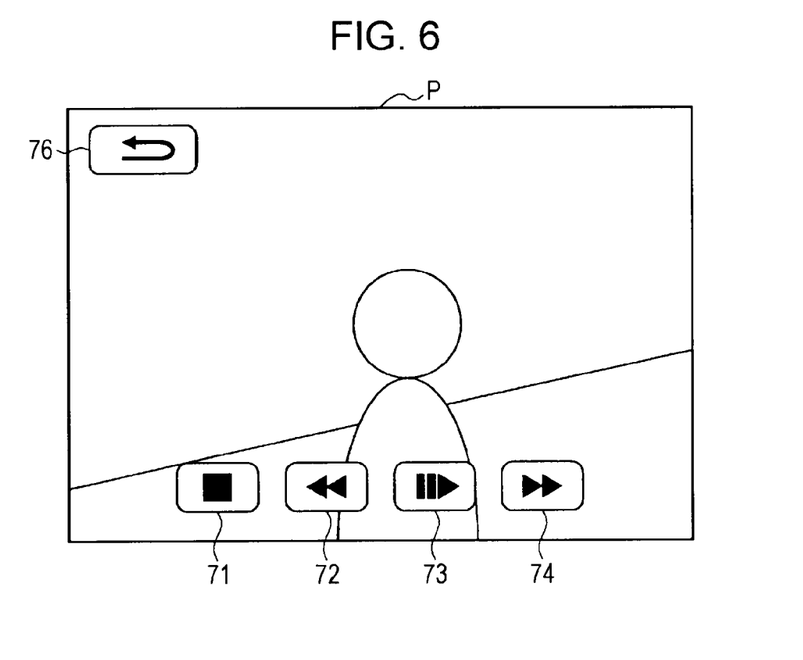
FIG. 6 is a diagram describing a concrete example of a reproduction screen image.

FIG. 6 is a diagram describing a concrete example of a content data reproduction screen image P. As illustrated in FIG. 6, the content data reproduction screen image P includes a stop button 71, a rewind button 72, a play/pause button 73, a fast-forward button 74, and a return button 76.

When a user selects one of the stop button 71, the rewind button 72, the play/pause button 73, and the fast-forward button 74, the image pickup apparatus 1 controls the reproduction of content data on the basis of the selected button. For example, when a user selects the stop button 71, the image pickup apparatus 1 stops the reproduction of content data. When a user selects the return button 76, the image pickup apparatus 1 stops the reproduction of content data and creates the index screen image I.

An exemplary case in which the switching between the image capturing mode and the reproduction mode is performed in response to a user's operation performed on the mode operation unit 24 has been described. However, the trigger for mode switching is not limited to the exemplary case. For example, when a user selects a reproduction mode set button added on the image capturing screen image R, the image pickup apparatus 1 may change an operation mode to the reproduction mode. When a user selects an image capturing mode set button added on the index screen image I or the reproduction screen image P, the image pickup apparatus 1 may change an operation mode to the image capturing mode.

The index screen image I is not limited to the example illustrated in FIG. 5. For example, the index screen image I may be a screen image obtained by putting a thumbnail of image data at a position (for example, an image capturing position) on a map related to the image data or a screen image obtained by putting a thumbnail of image data at a position (for example, image capturing date and time) on a time axis related to the image data.

In the reproduction mode, the image pickup apparatus 1 may display the index screen image I or the reproduction screen image P on the touch panel 12 or project the index screen image I or the reproduction screen image P from the projector module 18.

(Background of Embodiments of the Present Disclosure)

When the above-described operation mode switching is performed in the image pickup apparatus 1, the image pickup apparatus 1 performs control processing on the basis of the set mode. For example, when the mode operation unit 24 is operated in the image capturing mode and the reproduction mode is set, the image pickup apparatus 1 displays, for example, the index screen image I on the touch panel 12. A user can select content to be reproduced from among thumbnails included in the index screen image I.

Subsequently, when the projection switching operation unit 25 is operated and a projection start instruction is input, the image pickup apparatus 1 activates a projector. After the projector has been activated, the index screen image I is projected from the projector module 18.

The activation of the projector takes time for the following reasons. For example, it can be considered that it takes a long time to obtain stable brightness of a light source used by the projector. In particular, in the case of a projector including a high-pressure mercury lamp as a light source, it takes several tens of seconds to obtain stable brightness of the light source. For example, when an LED (Light Emitting Diode) is used as a light source, a time taken to turn on the light source can be significantly reduced but is still several seconds. In addition, various initial settings of a projector are one of the reasons.

Thus, since it takes time to activate a projector and a user has to wait until projection of an image from the projector module 18 is started after operating the projection switching operation unit 25, the user feels stress.

For this reason, in consideration of the above-described situation, embodiments of the present disclosure are made. According to embodiments of the present disclosure, when an operation mode is changed to the reproduction mode in the image pickup apparatus 1, processing for activating a projection unit can be started in advance. Embodiments of the present disclosure will be described in detail below.

[2. First Embodiment]

(2-1. Configuration of Image Pickup Apparatus)

Figure 7:
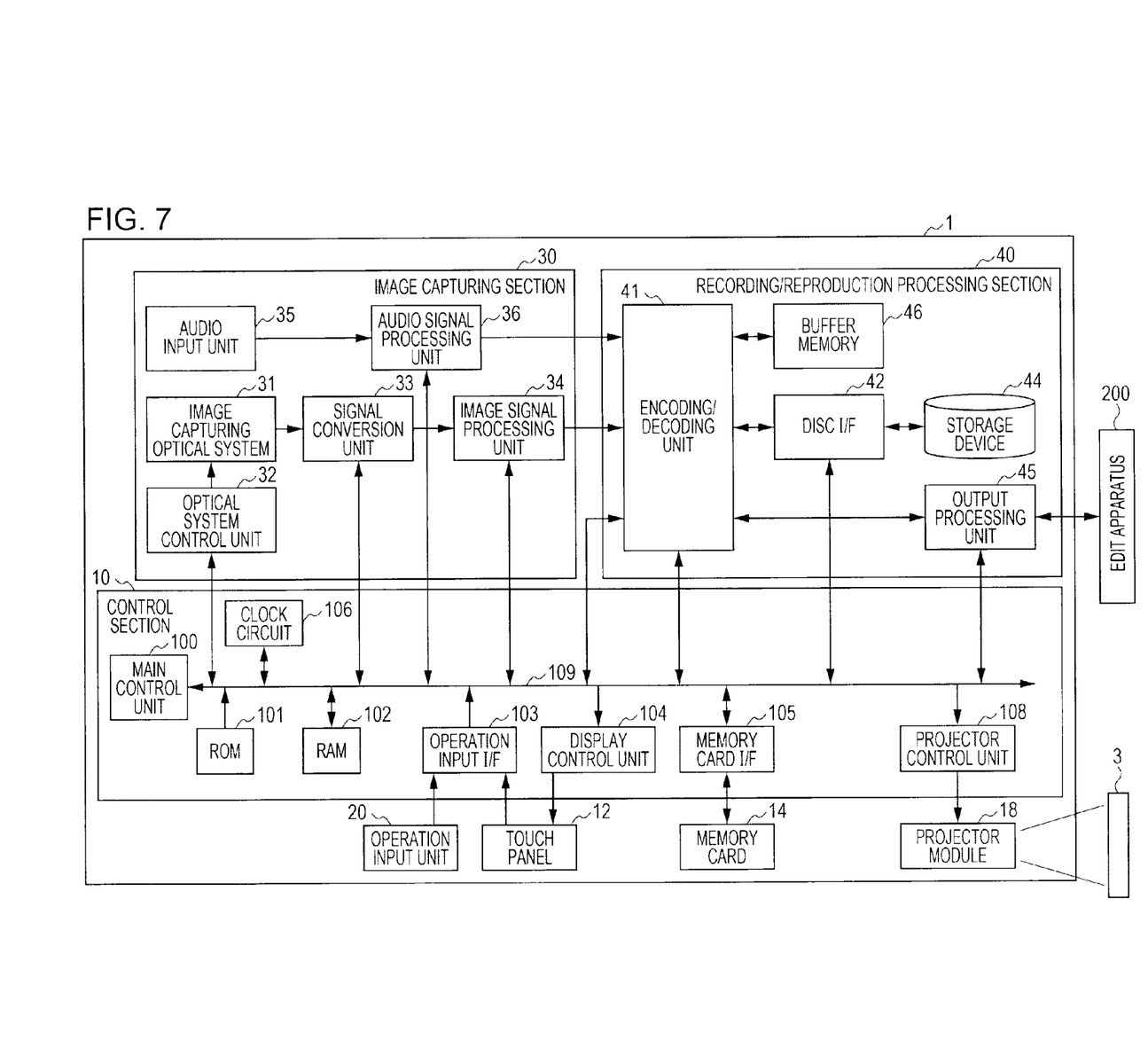
FIG. 7 is a block diagram illustrating the configuration of an image pickup apparatus according to a first embodiment of the present disclosure.

FIG. 7 is a block diagram illustrating the configuration of the image pickup apparatus 1 according to the first embodiment of the present disclosure. As illustrated in FIG. 7, the image pickup apparatus 1 according to the first embodiment of the present disclosure includes a control section 10, an image capturing section 30, and a recording/reproduction processing section 40.

The image capturing section (an image capturing unit) 30 includes an image capturing optical system 31, an optical system control unit 32, a signal conversion unit 33, an image signal processing unit 34, a audio input unit 35, and an audio signal processing unit 36.

The image capturing optical system 31 includes a group of lenses for capturing the image of a subject, an iris adjustment mechanism, a focus adjustment mechanism, a zoom mechanism, a shutter mechanism, a flash mechanism, a camera-shake correction mechanism, etc., and forms a subject image on the signal conversion unit 33.

Upon receiving a control signal from the control section 10, the optical system control unit 32 generates a control signal to be supplied to the image capturing optical system 31. The optical system control unit 32 supplies the generated control signal to the image capturing optical system 31 to perform zoom control processing, shutter control processing, exposure processing, and other processing.

The signal conversion unit 33 includes an image pickup element such as a CCD or CMOS as described previously. Upon receiving an image acquisition timing signal, which has been input by a user with the operation input unit 20, from the control section 10, the signal conversion unit 33 converts a subject image formed on an image plane by the image capturing optical system 31 into an electric image signal and supplies the electric image signal to the image signal processing unit 34. Since an image acquisition timing signal is continuously supplied from the control section 10 in the image capturing mode, the signal conversion unit 33 repeatedly performs the conversion of a subject image into an image signal to acquire image signals corresponding to a plurality of frames.

The image signal processing unit 34 performs gamma correction, AGC (Auto Gain Control), and other processing on an image signal and converts the processed image signal into a digital image signal on the basis of a control signal transmitted from the control section 10.

The audio input unit 35 collects sound around a subject in the image capturing mode, converts the collected sound into an electric audio signal, and supplies the electric audio signal to the audio signal processing unit 36. The audio signal processing unit 36 performs correction, AGC, and other processing on the audio signal and converts the processed audio signal into a digital audio signal on the basis of a control signal transmitted from the control section 10.

As illustrated in FIG. 7, the recording/reproduction processing section 40 includes an encoding/decoding unit 41, a disc interface 42, a storage device 44, an output processing unit 45, and a buffer memory 46, and functions as a reproduction section and a recording section.

The encoding/decoding unit 41 has an encoding function of encoding and multiplexing an image signal and an audio signal from the image capturing section 30 and additional recording information such as time information in the MPEG standard and converting them into compressed data including image data and audio data.

In addition, the encoding/decoding unit 41 (a reproduction processing unit) has a decoding function (reproduction function) of separating the image data and the audio data from the compressed data and decoding the image data and the audio data into an image signal and an audio signal, respectively.

Furthermore, the encoding/decoding unit 41 performs automatic white balance control, exposure correction control, zoom control depending on a digital zooming factor, and other control processing on the image signal supplied from the image signal processing unit 34 on the basis of a control signal transmitted from the control section 10.

The disc interface 42 receives the compressed data from the encoding/decoding unit 41 and writes the compressed data in the storage device 44. Furthermore, the disc interface 42 reads the compressed data from the storage device 44 and supplies the compressed data to the encoding/decoding unit 41. The storage device 44 may be an optical disc such as a DVD-R (Digital Versatile Disc Recordable) or a BD (Blu-Ray Disc (registered trademark)).

The output processing unit 45 is controlled by the main control unit 100 via a system bus 109. The output processing unit 45 supplies compressed data from the encoding/decoding unit 41 to the control section 10 and an edit apparatus 200. The edit apparatus 200 may be, for example, an information processing apparatus connected to the image pickup apparatus 1 via an output terminal of the output processing unit 45. A user can edit image data and audio data using the edit apparatus 200.

The buffer memory 46 is, for example, an SDRAM, and is used as a work area for encoding/decoding performed by the encoding/decoding unit 41.

As illustrated in FIG. 7, in the control section 10, the main control unit 100, a ROM (Read-Only Memory) 101, a RAM (Random Access Memory) 102, an operation input interface 103 for receiving an operation input from the operation input unit 20 and the touch panel 12, a display control unit 104 for controlling the touch panel 12, a memory card interface 105 used for insertion of a memory card 14, a clock circuit 106 for generating time information used for recording of an image capturing time, and a projector control unit 108 for controlling the projector module 18 are connected via the system bus 109.

The main control unit 100 performs entire processing of the image pickup apparatus 1 and uses the RAM 102 as a work area. The main control unit 100 performs control processing in accordance with an operation mode set by a user's operation performed on the mode operation unit 24.

For example, when an operation mode is the image capturing mode, the main control unit 100 stops the supply of power to the projector control unit 108 and the projector module 18 and displays an image corresponding to an image signal supplied from the image signal processing unit 34 on the touch panel 12 via the display control unit 104.

When an operation mode is the reproduction mode, the main control unit 100 stops the supply of power to the image capturing section 30, creates the reproduction screen image P or the index screen image I on the basis of an image data reproduction signal or a thumbnail supplied from the encoding/decoding unit 41, and displays the reproduction screen image P or the index screen image I on the touch panel 12 via the display control unit 104.

A program for controlling the image capturing section 30 and a program for controlling the recording and reproduction of an image signal and an audio signal are written in the ROM 101.

The operation input interface 103 transmits operation signals transmitted from the operation input unit 20 and the touch panel 12 connected thereto to the main control unit 100. The zoom operation unit 21, the manual operation unit 22, the still image capturing operation unit 23, the mode operation unit 24, and the projection switching operation unit 25, which are illustrated in FIG. 1, are collectively called the operation input unit 20.

The display control unit 104 performs display control processing so that an image corresponding to an image signal supplied from the image signal processing unit 34 or the reproduction screen image P or the index screen image I created by the main control unit 100 is displayed on the touch panel 12.

The memory card interface 105 writes compressed data supplied from the encoding/decoding unit 41 into the memory card 14. Furthermore, the memory card interface 105 reads out the compressed data from the memory card 14 and supplies the read compressed data to the encoding/decoding unit 41.

The clock circuit 106 generates time information indicating, for example, year, month, day, time, minute, and second.

The projector control unit 108 performs control processing so that a screen image is projected from the projector module 18 onto a projection surface 3. Under the control of the projector control unit 108, for example, the reproduction screen image P or the index screen image I is projected from the projector module 18 onto the projection surface 3.

(2-2. Operation of Image Pickup Apparatus)

Figure 8:
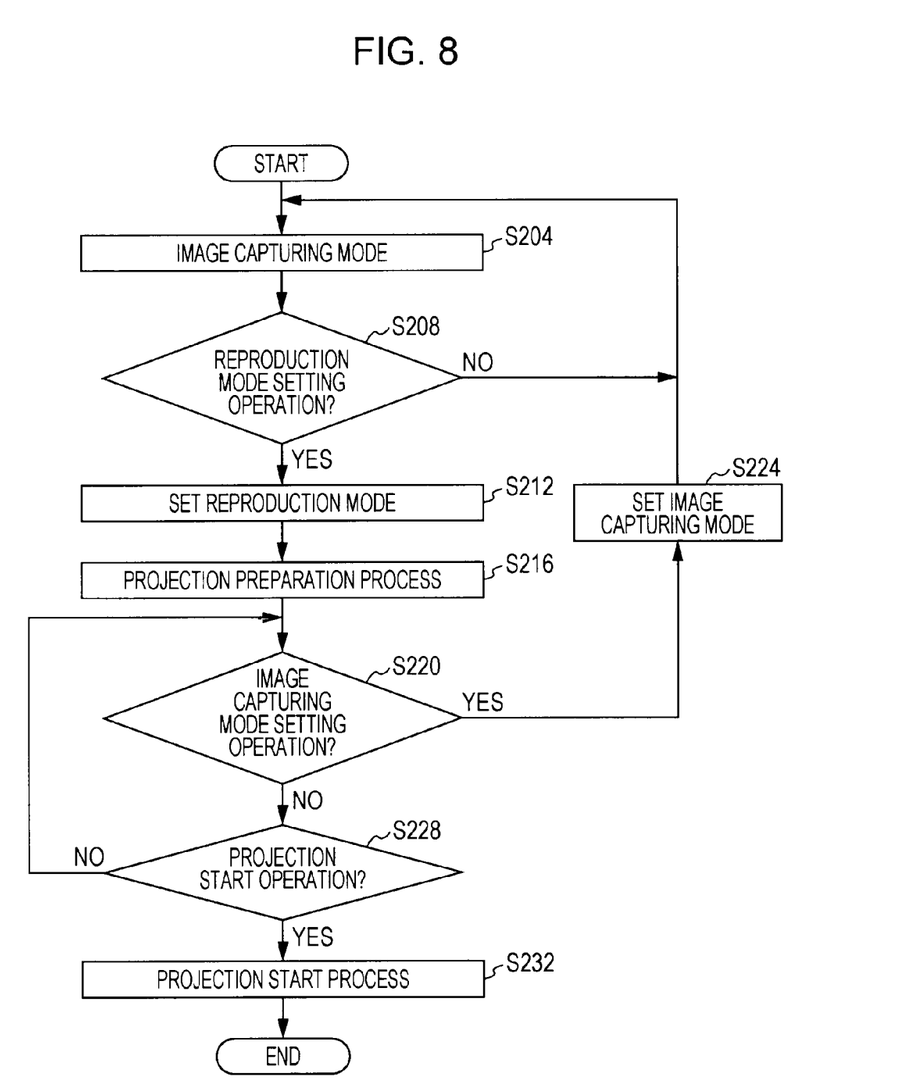
FIG. 8 is a flowchart illustrating an operation process performed by an image pickup apparatus according to the first embodiment of the present disclosure.

Next, the operation of the image pickup apparatus 1 according to this embodiment will be described with reference to FIG. 8. FIG. 8 is a flowchart illustrating the operation process of the image pickup apparatus 1 according to this embodiment.

As illustrated in FIG. 8, first, while the image pickup apparatus 1 is in the image capturing mode (step S204), a user operates the mode operation unit 24 (Yes in step S208) and the operation mode of the image pickup apparatus 1 is changed to the reproduction mode (step S212). When the operation mode of the image pickup apparatus 1 is changed to the reproduction mode, the display control unit 104 displays the index screen image I on the touch panel 12.

Subsequently, the main control unit 100 performs a preparation process (activation process) to achieve projection of an image from the projector module 18 (step S216). The projection preparation process will be described in detail later with reference to FIG. 9.

Subsequently, when the mode operation unit 24 is operated by a user again (Yes in step S220), the operation mode of the image pickup apparatus 1 is changed to the image capturing mode (step S224). When the image capturing mode is set, the supply of power to the projector control unit 108 and the projector module 18 is stopped.

On the other hand, when the switching to the image capturing mode is not performed (No in step S220) and a projection start instruction is input by a user with the projection switching operation unit 25 (Yes in step S228), the projector control unit 108 controls the projector module 18, performs a projection start process (step S232), and start projection of an image from the projector module 18. The projection start process will be described in detail later with reference to FIG. 10.

Figure 9:
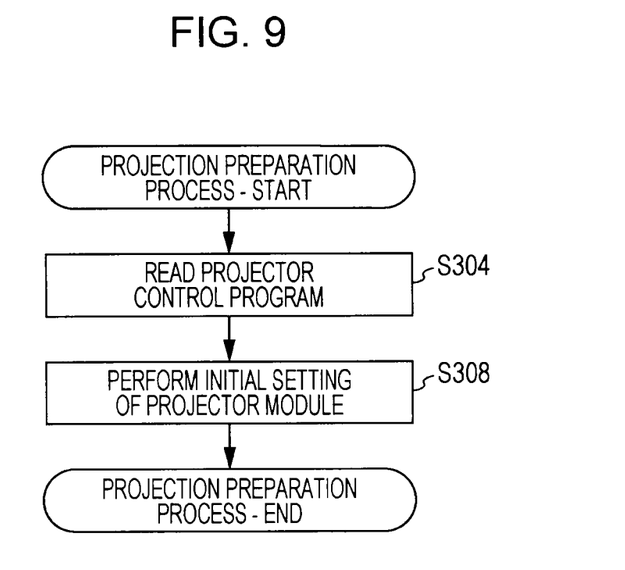
FIG. 9 is a flowchart illustrating a projection preparation process in the flowchart in FIG. 8.

Next, a concrete example of the projection preparation process in step S216 will be described with reference to FIG. 9. As illustrated in FIG. 9, the main control unit 100 decompresses a projector control program stored in the ROM 101 onto the RAM 102 (step S304). As a result, the main control unit 100 can request the projector control unit 108 to perform various processing operations.

Subsequently, the main control unit 100 performs the initial setting of the projector module 18 (step S308). In the initial setting, for example, the resolution, size, direction, and color information of a screen image to be projected are set.

Figure 10:
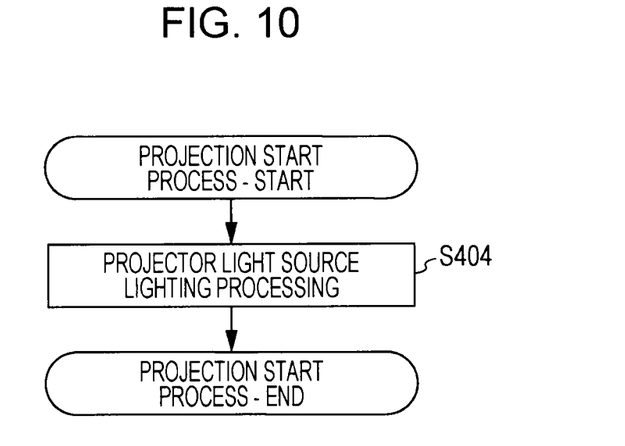
FIG. 10 is a flowchart illustrating a projection start process in the flowchart in FIG. 8.

Next, a concrete example of the projection start process in step S232 will be described with reference to FIG. 10. As illustrated in FIG. 10, in the projection start process, the projector control unit 108 turns on the light source 182 of the projector module 18 (step S404).

In this embodiment, as described previously, since the decompression of the projector control program and the initial setting of the projector module 18 are completed in the projection preparation process illustrated in FIG. 9, the projector control unit 108 has only to turn on the light source 182 in the projection start process.

Figure 11:
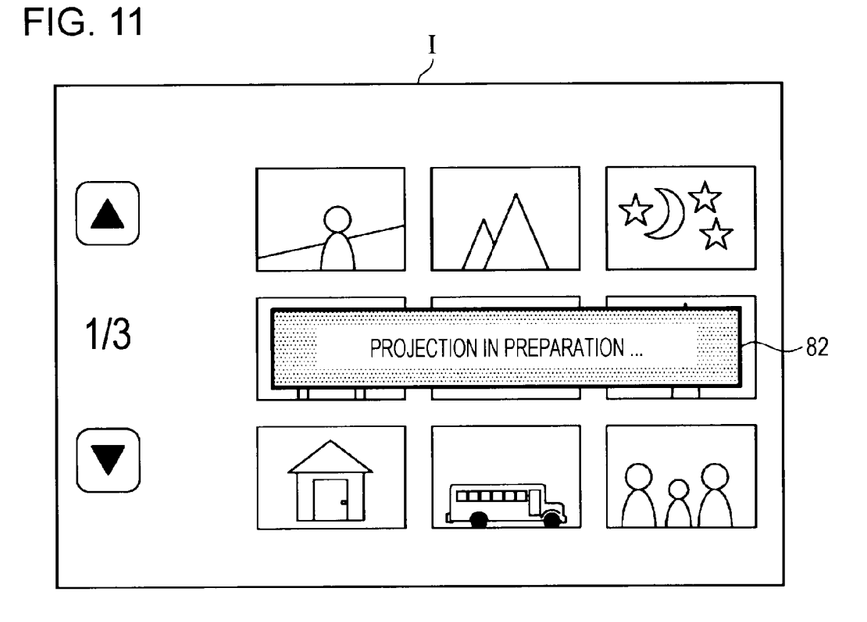
FIG. 11 is a diagram describing a concrete example of an index screen image created by a main control unit.

In this embodiment, when the projection start instruction is input during the projection preparation process in step S216 in FIG. 8 or before the projection preparation process ends (Yes in step S228), the display control unit 104 may notify a user of the fact that the projection preparation process is being performed. For example, as illustrated in FIG. 11, the display control unit 104 may display characters 82, "projection in preparation" on the index screen image I on the touch panel 12.

Figure 12:
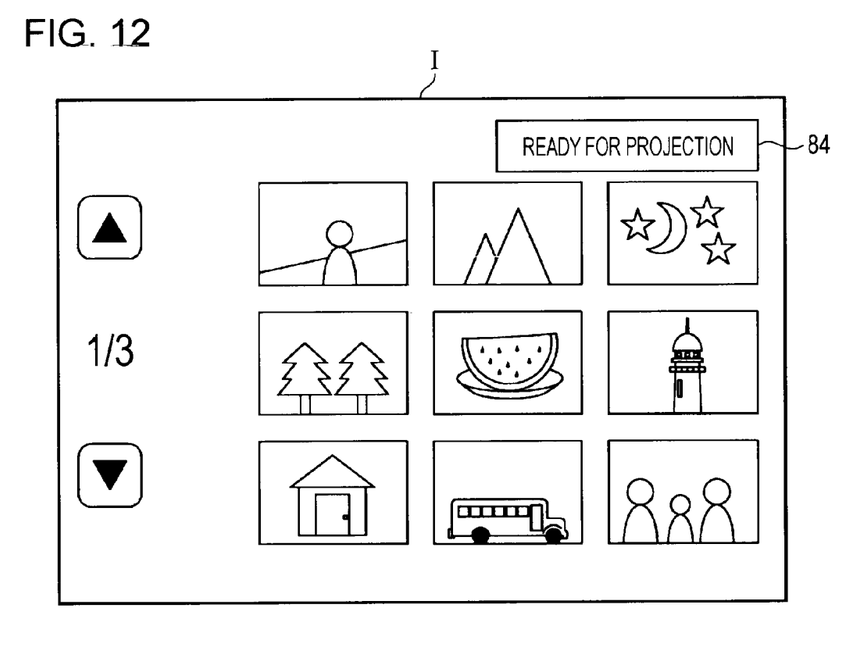
FIG. 12 is a diagram describing a concrete example of an index screen image created by a main control unit.

When the projection preparation process in step S216 in FIG. 8 ends, the display control unit 104 may notify a user of the fact that the projection preparation process has ended. For example, as illustrated in FIG. 12, the display control unit 104 may display characters 84, "ready for projection" on the index screen image I on the touch panel 12.

In the flowchart in FIG. 8, the projection preparation process is started when the operation mode of the image pickup apparatus 1 is changed to the reproduction mode. After that, when the projection switching operation unit 25 is operated by a user, projection is started. A process performed in a case in which the projection switching operation unit 25 is operated in the image capturing mode will be described.

When the image pickup apparatus 1 according to this embodiment is in the image capturing mode, the projection switching operation unit 25 is operated by a user, and a projection start instruction is input, the operation mode of the image pickup apparatus 1 is changed to the reproduction mode and a projection preparation process is performed. The index screen image I is displayed on the touch panel 12 and the characters 82, "projection in preparation", are displayed like in the example illustrated in FIG. 11 during the projection preparation process. When the projection preparation process ends, the projection start process is performed. When the projection start process ends, projection of an image from the projector module 18 onto the projection surface 3 is started.

[3. Second Embodiment]

In the first embodiment, as illustrated in FIG. 10, the light source 182 is turned on in the projection start process. Since the projection start process is performed after a projection start instruction has been input, a user has to wait for a time necessary to turn on the light source until projection is started after performing the projection switching operation unit 25. The time necessary to turn on the light source 182 is changed in accordance with the characteristic of the light source 182. For example, in the case of a white LED used in the first embodiment, it takes several seconds to turn on the white LED. In the case of a high-pressure mercury lamp, it takes several tens of seconds to turn on the high-pressure mercury lamp and a user has to wait for a long time.

In the image pickup apparatus 1 according to the second embodiment of the present disclosure, the processing for turning on the light source 182 is performed in the projection preparation process to quickly start projection.

Figure 13:
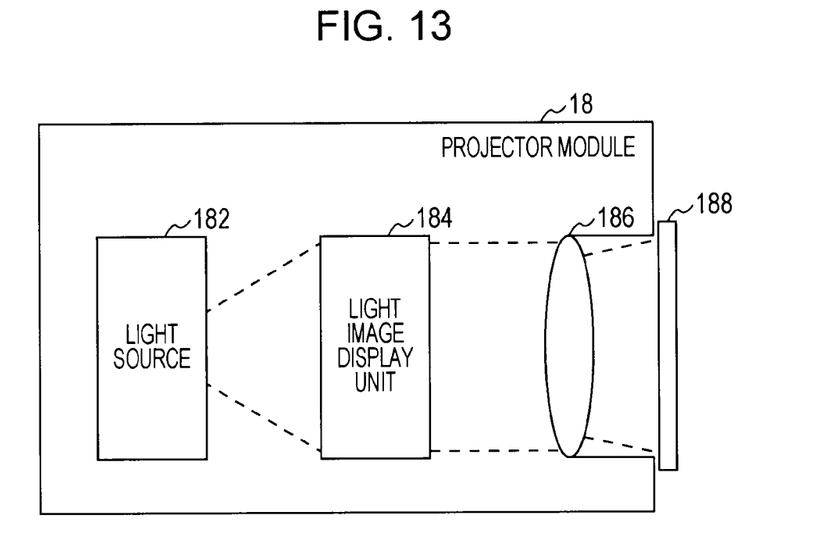
FIG. 13 is a diagram describing the configuration of a projector module according to a second embodiment of the present disclosure.

The configuration of the projector module 18 in the image pickup apparatus 1 according to this embodiment will be described with reference to FIG. 13. As illustrated in FIG. 13, the projector module 18 includes the light source 182, the light image display unit 184, a projection lens 186, and a lid 188.

The lid 188 is disposed so that it interrupts projection of an image from the projection lens 186. The opening and closing of the lid 188 is controlled by a driving unit (not illustrated). The lid 188 illustrated in FIG. 13 is an example of a lid for blocking light from the light source 182. The position and operation method of the lid 188 are not limited to those illustrated in FIG. 13.

The projection preparation process performed by the image pickup apparatus 1 according to this embodiment will be described with reference to FIG. 14.

Figure 14:
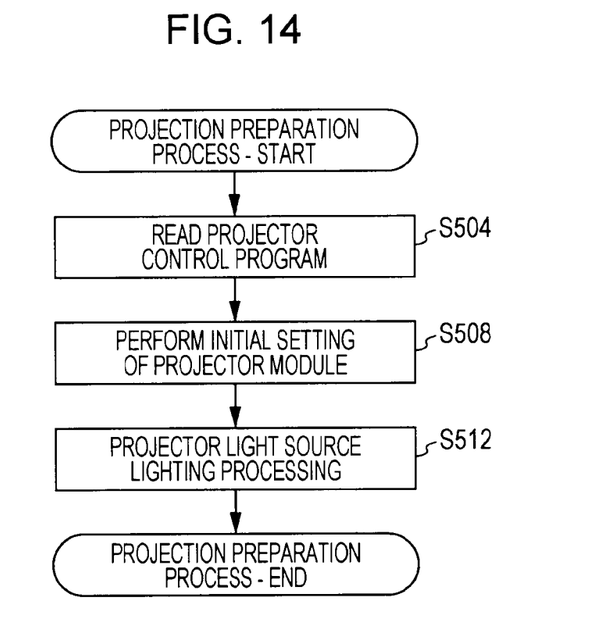
FIG. 14 is a flowchart illustrating a projection preparation process performed by an image pickup apparatus according to the second embodiment of the present disclosure.

As illustrated in FIG. 14, the main control unit 100 decompresses a projector control program stored in the ROM 101 onto the RAM 102 (step S504). As a result, the main control unit 100 can request the projector control unit 108 to perform various processing operations.

Subsequently, the main control unit 100 performs the initial setting of the projector module 18 (step S508). In the initial setting, for example, the resolution, size, direction, and color information of a screen image to be projected are set.

Subsequently, the main control unit 100 performs processing for turning on the light source 182 in a sate in which the lid 188 is closed (step S512). Even when the light source 182 is turned on, light transmitted from the light source 182 through the projection lens 186 is blocked by the closed lid 188.

After that, when a projection start instruction is input, the lid 188 is opened and projection is started in the projection start process. Thus, by turning on the light source 182 in advance in the projection preparation process, projection can be more quickly started. When a projection start instruction is not input within a predetermined period after the light source 182 has been turned on in the projection preparation process, the light source 182 may be turned off.

[4. Conclusion]

As described previously, since the image pickup apparatus 1 according to an embodiment of the present disclosure performs the projection preparation process in advance, projection of an image from the projector module 18 can be quickly performed at the time of input of a projection start instruction.

Since the lid 188 that blocks light emitted from the light source 182 is disposed and the light source 182 is turned on in advance in the projection preparation process, projection of an image from the projector module 18 can be more quickly performed.

Although the preferred embodiments of the present disclosure have been described in detail with reference to the accompanying drawings, the present disclosure is not limited thereto. It is obvious that various changes and modifications of the embodiments can be made by those skilled in the art without departing from the spirit and scope of the present disclosure. Accordingly, it should be understood that these changes and modifications fall within the scope of the present disclosure.

For example, the image pickup apparatus 1 in this specification does not necessarily execute steps in chronological order described in a flowchart. For example, the image pickup apparatus 1 may execute the steps in an order different from the order described in the flowchart or may execute the steps in a parallel manner.

It is possible to create a computer program for causing hardware built in the image pickup apparatus 1 to realize a function equivalent to each configuration of the image pickup apparatus 1. In addition, there is provided a storage medium in which the computer program is stored.

The present disclosure contains subject matter related to that disclosed in Japanese Priority Patent Application JP 2010-214656 filed in the Japan Patent Office on Sep. 27, 2010, the entire contents of which are hereby incorporated by reference.

What is claimed is:

1. An image pickup apparatus comprising:
an image capturing device;
a projection device;
a reproduction processing unit implemented by circuitry and configured to perform processing for reproducing image data;
a display control unit implemented by the circuitry and configured to control a display device to display image data captured by the image capturing device; and
a control unit implemented by the circuitry and configured to switch between operation modes at least including an image capturing mode in which the image capturing device performs image capturing and a reproduction mode in which the reproduction processing unit performs reproduction processing, and to control the display control unit to control the display device to display the image data captured by the image capturing device, and wherein, when the operation mode is switched from the image capturing mode to the reproduction mode, the control unit starts, while a lid blocking light from a light source of the projection device is closed, activation processing for activating the projection device, the activation processing including processing for turning on the light source of the projection device after the operation mode is switched from the image capturing mode to the reproduction mode, before receiving a projection start instruction, and when the lid blocking light from the light source is closed, wherein the lid blocking the light from the light source is closed while the operation mode is switched from the image capturing mode to the reproduction mode, and wherein, when the projection device receives the projection start instruction, the projection unit device starts projection on to a projection surface.

2. The image pickup apparatus according to claim 1, wherein, after the activation processing has ended and the projection start instruction to cause the projection device to start projection has been input, the control unit causes the projection device to start the projection.

3. The image pickup apparatus according to claim 2, further comprising the display device, and wherein, in the reproduction mode, an image data selection screen image is displayed on the display device, and the reproduction processing unit reproduces image data selected on the image data selection screen image.

4. The image pickup apparatus according to claim 3, wherein, while the activation processing for activating the projection device is performed in the reproduction mode, the control unit displays a fact that the activation processing is being performed on the display device.

5. The image pickup apparatus according to claim 3, wherein, when the projection start instruction is input during the activation processing for activating the projection device in the reproduction mode, the control unit displays a fact that the activation processing is being performed on the display device.

6. The image pickup apparatus according to claim 3, wherein, while the projection start instruction to cause the projection device to start projection is not input after the activation processing for activating the projection device has ended in the reproduction mode, the control unit displays a fact that the activation processing has ended on the display device.

7. The image pickup apparatus according to claim 3, wherein the activation processing for activating the projection device includes initial setting of the projection device.

8. The image pickup apparatus according to claim 3, wherein the lid is opened when the projection device starts projection.

9. The image pickup apparatus according to claim 8, wherein the light source of the projection device is a high-pressure mercury lamp.

10. The image pickup apparatus according to claim 2, wherein the control unit switches to the reproduction mode and after switching to the reproduction mode, an index screen image is created that includes a plurality of image data, the display device displays the index screen image, the reproduction processing unit reproduces image data selected on the index screen image, and while the activation processing for activating the projection device is performed in the reproduction mode, the control unit displays a fact that the activation processing is being performed on the index screen image on the display device.

11. The image pickup apparatus according to claim 1, wherein the control unit is configured to open the lid in response to the projection start instruction being received by the projection device.

12. The image pickup apparatus according to claim 1, wherein the control unit switches to the reproduction mode and after switching to the reproduction mode, an index screen image is created that includes a plurality of image data.

13. The image pickup apparatus according to claim 1, wherein the control unit is configured to turn off the light source in response to the projection start instruction not being received within a predetermined period of time.

14. An image pickup apparatus control method comprising:

controlling, by display control circuitry, a display device to display image data captured by an image capturing device;

switching between operation modes at least including an image capturing mode in which the image capturing device performs image capturing and a reproduction mode in which reproduction processing circuitry performs reproduction processing to set the reproduction mode, and controlling, by the display control circuitry, the display device to display the image data captured by the image capturing device;

starting, while a lid blocking light from a light source of a projection device is closed, activation processing for activating the projection device when the reproduction mode is set, the activation processing including processing for turning on the light source of the projection device after the operation mode is switched from the image capturing mode to the reproduction mode, before receiving a projection start instruction, and when the lid blocking light from the light source is closed, the lid blocking the light from the light source being closed while the operation mode is switched from the image capturing mode to the reproduction mode; and starting projection on to a projection surface, when the projection device receives the projection start instruction.

15. A non-transitory computer-readable storage medium including computer executable instructions, wherein the instructions, when executed by a computer, cause the computer to perform a method, the method comprising:

controlling, by display control circuitry, a display device to display image data captured by an image capturing device;

switching between operation modes at least including an image capturing mode in which the image capturing device performs image capturing and a reproduction mode in which reproduction processing circuitry performs reproduction processing to set the reproduction mode, and controlling, by the display control circuitry, the display device to display the image data captured by the image capturing device;

starting, while a lid blocking light from a light source of a projection device is closed, activation processing for activating the projection device when the reproduction mode is set, the activation processing including processing for turning on the light source of the projection device after the operation mode is switched from the image capturing mode to the reproduction mode, before receiving a projection start instruction, and when the lid blocking light from the light source is closed, the lid blocking the light from the light source being closed while the operation mode is switched from the image capturing mode to the reproduction mode; and starting projection on to a projection surface, when the projection device receives the projection start instruction.

* * * * *